Aug. 8, 1950 D. RUSHWORTH 2,518,071
SELF-WINDING REEL FOR CABLES AND THE LIKE
Filed Aug. 26, 1947 2 Sheets-Sheet 1

David Rushworth
Inventor by Mason, Porter, Diller & Stewart
Attorneys

Aug. 8, 1950     D. RUSHWORTH     2,518,071
SELF-WINDING REEL FOR CABLES AND THE LIKE
Filed Aug. 26, 1947     2 Sheets-Sheet 2

Patented Aug. 8, 1950

2,518,071

UNITED STATES PATENT OFFICE 2,518,071

SELF-WINDING REEL FOR CABLES AND THE LIKE

David Rushworth, West Bridgford, England

Application August 26, 1947, Serial No. 770,663
In Great Britain May 2, 1946

Section 1, Public Law 690, August 8, 1946
Patent expires May 2, 1966

4 Claims. (Cl. 242—86)

This invention relates to improvements in self-winding reels for holding electric cable or hose for conducting gases or liquids and its object is to provide a reel from which a predetermined amount of cable or hose can be drawn whilst obviating the necessity of providing electrical contacts in the case of electrical cable or of fluid tight joints in the case of hose.

According to this invention the reel comprises a drum onto which a predetermined amount of cable or the like is wound, a spring to turn the drum to re-wind thereon cable or the like withdrawn therefrom and a chamber associated with the drum to hold a sufficient length of the cable or the like to permit of the drum being turned to un-wind all the cable or the like thereon. The interior of the drum may comprise the chamber or a separate chamber may be provided and disposed on the side of the drum. The axle of the drum may pass through the chamber and the cable or the like therein be disposed round the axle.

The invention will now be more particularly described with reference to the accompanying drawings in which—

Like letters indicate like parts throughout the drawings.

In one method of carrying out this invention the reel comprises a drum A adapted to carry on the outside thereof a predetermined length of cable B or hose. The drum A is rotatably mounted on an axle C which may conveniently be carried by a suitable mounting plate or bracket D and a spring is provided to turn the drum to re-wind thereon, in well known manner, when desired, cable or the like withdrawn from the drum.

Figure 1:
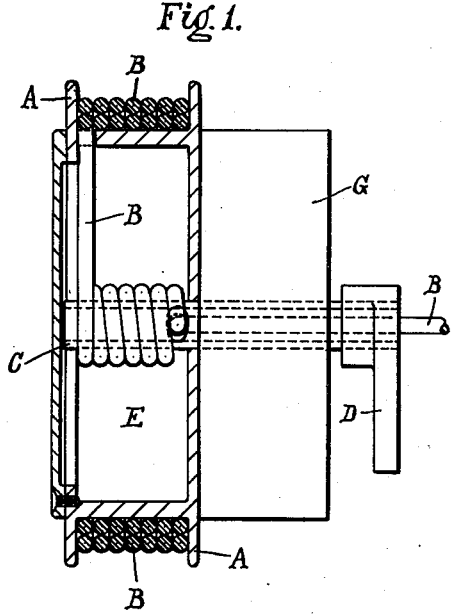
Fig. 1 is a side elevation partly in section and
Fig. 2 is a front elevation of a reel constructed according to this invention with a predetermined amount of cable or the like disposed thereon.
Figure 3:
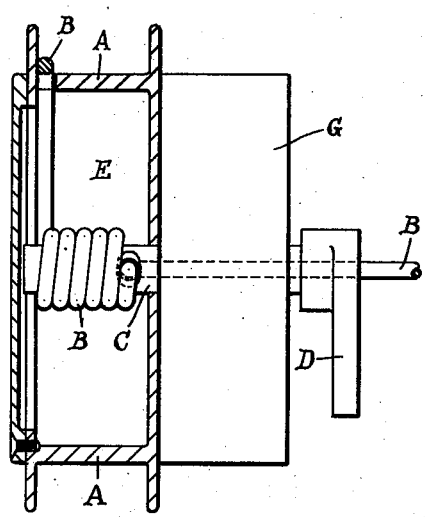
Fig. 3 is a side elevation partly in section with all the cable or the like withdrawn from the drum.
Figure 2:
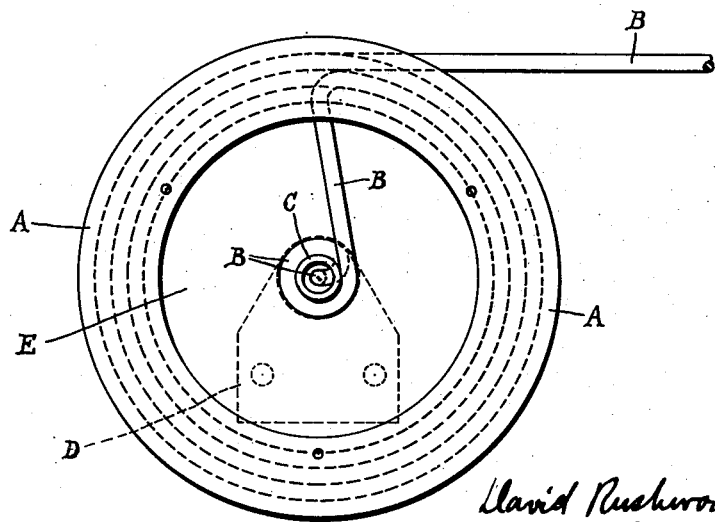

Associated with the drum is a chamber E. This chamber is co-axial with the drum A and may comprise the interior of the drum as shown in Figs. 1 to 3 or be formed by a casing F attached to the side of the drum A as shown in Fig. 4.

The cable B or the like is led through a fixed opening into the chamber E and a predetermined amount disposed therein, the cable B or the like then passing from the chamber E in any convenient manner and is wound on the drum A. The amount of cable B or the like disposed in the chamber E depends upon the amount of cable or the like disposed on the outside of the drum A and is sufficient to permit of the drum being turned to pay out all the cable or the like wound on the outside thereof. For this purpose the cable B or the like is preferably arranged in the following manner. When the desired length of cable on the outside of the drum A has been wound thereon the cable B or the like disposed in the chamber E is arranged in a coil wound in the opposite direction to that disposed on the outside of the drum as shown in Figs. 1 and 2. If the axle C on which the drum is mounted extends through the chamber E as shown in the drawings the cable or the like disposed in the chamber E is wound round the axle C and in either case forms a coil of small diameter in comparison with the coil on the outside of the drum A. When the cable or the like is withdrawn from the drum A the coil in the chamber E is first unwound and further withdrawal of cable or the like from the drum coils up that disposed in the chamber in the opposite direction as shown in Fig. 3. On the cable being rewound onto the drum a similar action takes place but in the reverse direction. It will be understood that sufficient cable or the like is disposed in the chamber E to permit of the drum A rotating a sufficient number of times to pay out all the cable or the like disposed on the outside thereof and it will be readily seen that an appreciable amount of cable or the like can be accommodated on the outside of the drum whilst in comparison only a short length of cable or the like is disposed in the chamber E to permit of the drum rotating a sufficient number of times to pay out all the cable or the like disposed on the outside thereof. A spring or springs are provided to turn the drum A to re-wind the cable thereon and the spring or springs are disposed in a casing G attached to the side of the drum A.

Figure 4:
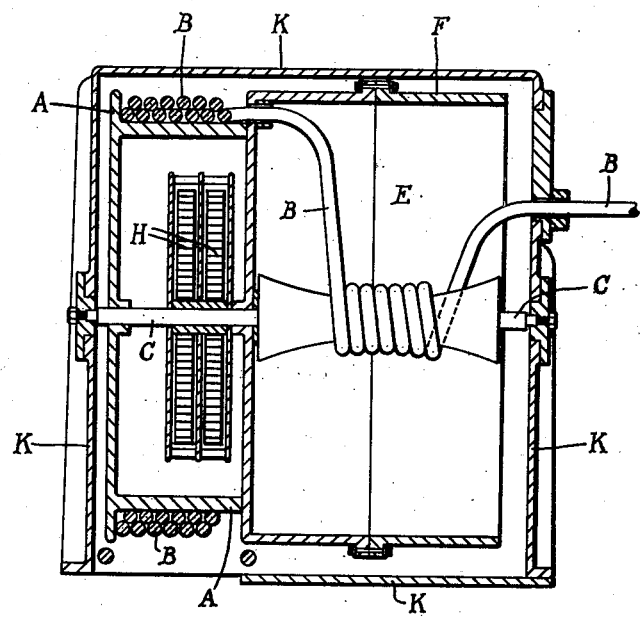
Fig. 4 is a sectional side elevation and
Fig. 5 is a front elevation partly in section showing an alternative form of construction.
Figure 5:
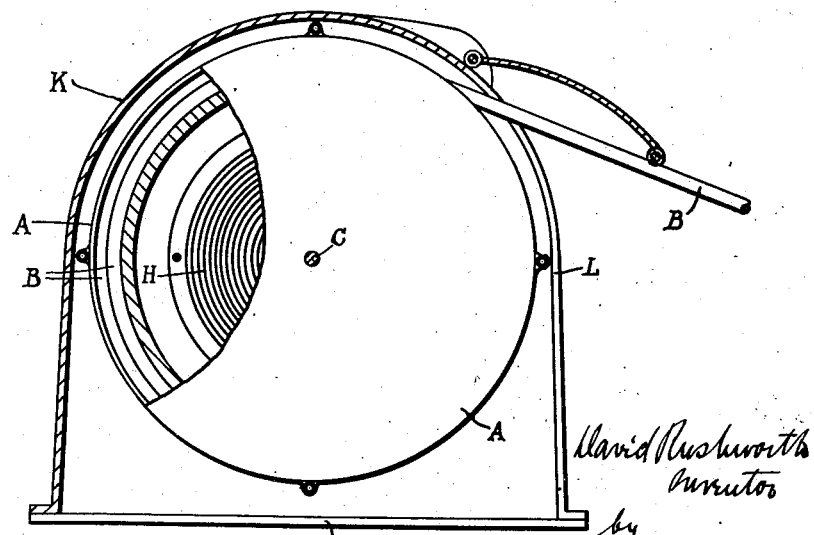

In an alternative construction shown in Figs. 4 and 5 the chamber E is formed by a casing F disposed on the side of the drum A. The spring H to turn the drum to re-wind the cable B or the like thereon is disposed in the interior of the drum A instead of in the interior of a casing disposed at the side of the drum as in the previously described arrangement. A bobbin J loosely mounted on the axle C may be provided in the chamber E and the cable B or the like disposed within the chamber wound on the bobbin.

The drum is disposed in an outer casing K and the cable B or the like withdrawn from the drum A through an opening L in the side of the casing K. The cable B is led into the chamber E through an opening or gland in the outer casing K.

With the arrangement described an electrical supply cable or a fluid pressure supply hose can be carried on a self winding reel and cable or hose withdrawn therefrom as required without the necessity of providing electrical contacts in the case of electrical cable or of fluid tight unions in the case of hose and consequently simplifying the construction and reducing the cost of the reels.

What I claim as my invention is:

1. A self-winding cable or the like reel comprising a rotatably mounted drum onto which a predetermined amount of cable or the like is wound, a spring to turn the drum to re-wind thereon cable or the like withdrawn therefrom, a casing secured to and rotating with the drum and forming a chamber to hold a sufficient length of cable or the like to permit of the drum being turned to un-wind all the cable or the like thereon.

2. A self-winding cable or the like reel according to claim 1 in which the axle on which the drum is mounted passes through the chamber.

3. A self-winding cable or the like reel according to claim 1 in which the drum is rotatably mounted on an axle which passes through the chamber rotating with the drum and has a bobbin mounted on that part of the axle disposed within the chamber.

4. A self-winding reel for cable and the like, comprising a rotatably mounted drum onto which a predetermined amount of cable or the like is wound, a spring in the drum to turn the drum to re-wind thereon cable or the like withdrawn therefrom, a chamber disposed at the side of the drum and formed by a casing rotatable with the drum and a sufficient length of cable or the like, which is integral with that on the drum, disposed in the chamber to permit of the drum being turned to unwind all the cable or the like thereon.

DAVID RUSHWORTH.

REFERENCES CITED

The following references are of record in the file of this patent:

UNITED STATES PATENTS

| Number | Name | Date |
| --- | --- | --- |
| 1,276,825 | Swope | Aug. 27, 1918 |
| 1,545,312 | Dolan | July 7, 1925 |

FOREIGN PATENTS

| Number | Country | Date |
| --- | --- | --- |
| 13,249 | Great Britain | June 7, 1913 |
| 184,388 | Switzerland | Aug. 1, 1936 |
| 478,803 | Great Britain | Jan. 25, 1938 |